United States Patent [19]

Rainville

[11] 3,881,854
[45] May 6, 1975

[54] MOLDING APPARATUS WITH NECK-GATED MOLD

[75] Inventor: Dewey Rainville, Westfield, N.J.

[73] Assignee: Rainville Company, Inc., Middlesex, N.J.

[22] Filed: May 10, 1973

[21] Appl. No.: 358,922

[52] U.S. Cl. ................. 425/242 B; 425/DIG. 209; 425/DIG. 211; 425/DIG. 233
[51] Int. Cl. ............................................. B29f 3/04
[58] Field of Search .......... 425/DIG. 209, DIG. 211, 425/242 B, 326 B, 387 B

[56] References Cited
UNITED STATES PATENTS

| | | | |
|---|---|---|---|
| 2,853,736 | 9/1958 | Gussoni | 425/DIG. 209 |
| 3,341,644 | 9/1967 | Allen | 425/242 B |
| 3,347,965 | 10/1967 | Valyi | 425/DIG. 209 |
| 3,697,210 | 10/1972 | Johnson | 425/242 B |
| 3,707,591 | 12/1972 | Chalfont | 425/242 B |

Primary Examiner—Andrew R. Juhasz
Assistant Examiner—Leon Gilden
Attorney, Agent, or Firm—Sandoe, Hopgood & Calimafde

[57] ABSTRACT

Injection molded articles of this invention are free of the usual imperfection on the surface of the article at the end opposite the opening through which the core rod extended into the article. Such imperfections result from the fact that the plastic is injected into the injection mold from the free end of the core rod, and the plastic is sucked back at the end of the injection operation to disconnect the runner plastic from that in the mold. This invention makes articles from parisons injected into the mold cavity at the same end as the core pin enters the cavity and thereby leaves a perfect surface at the other end of the article.

10 Claims, 5 Drawing Figures

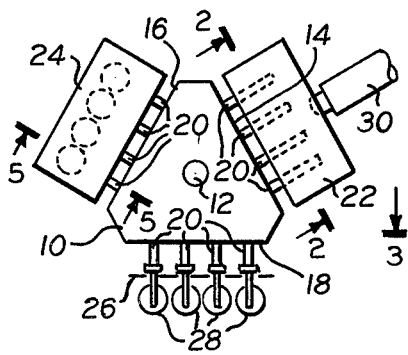
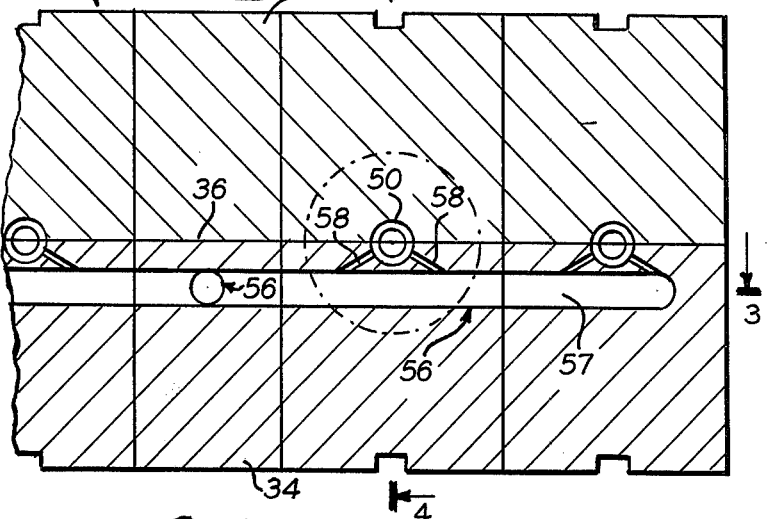
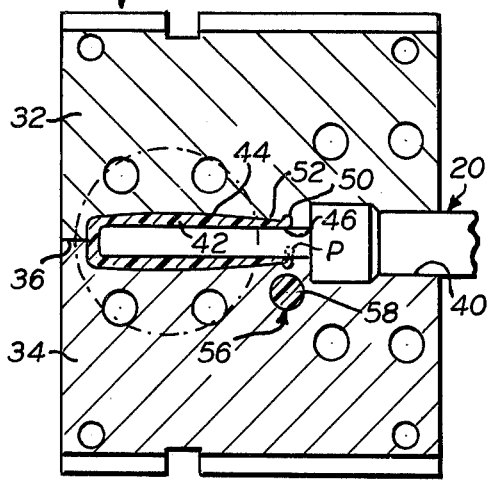
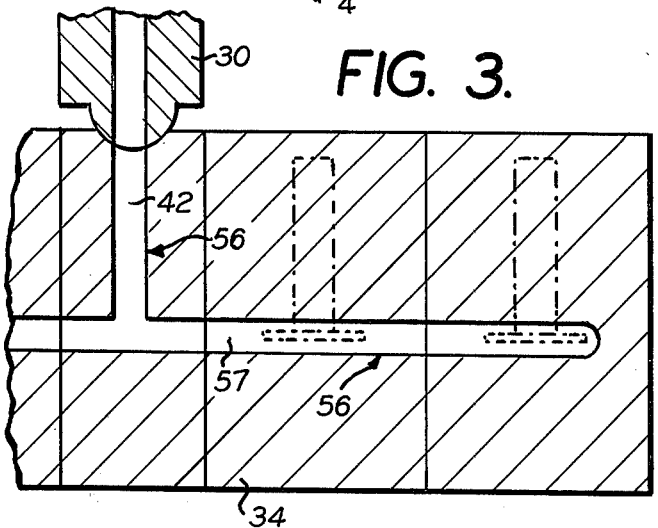
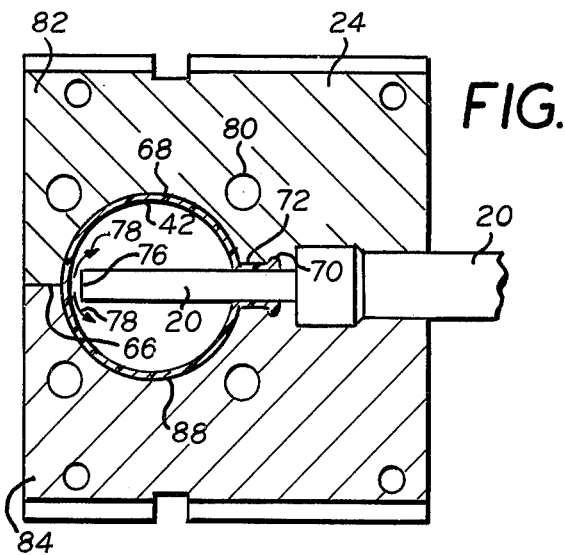

MOLDING APPARATUS WITH NECK-GATED MOLD

BACKGROUND AND SUMMARY OF THE INVENTION

The injection molds of conventional blow molding machines inject the plastic for the parison from the end of the mold cavity opposite to that through which the core rod enters the cavity. When the plastic is sucked back to disconnect it from the parison at the end of an injection operation, a rough region is left on the parison where the plastic pulls apart, and this causes an imperfection in the surface of the article even after the article has been blown.

When making conventional bottles or containers, this rough region on the surface is not considered objectionable because it is on the bottom of the container and not visible when the container is standing on a shelf or other support. For round bottles and Christmas tree ornaments, and the like, a perfectly formed surface is important on the curved part of the article which has curvature in three dimensions. The entire surface of such an article is exposed to view in the finished product and the round surface makes any roughness particularly noticeable because of the distortion in the reflection shown in the surface.

The injection mold of this invention has a passage which opens through one side of the mold and into which plastic is injected from an extruder nozzle. This passage leads through the mold and opens into the cavity adjacent to the end of the cavity where the core rod extends into the cavity. With multi-cavity molds, the passage from the extruder nozzle includes a manifold, and in the preferred construction the manifold has branch passages which extend into the different cavities with two of the branch passages leading into each cavity from opposite sides and in directions that slope at opposite acute angles from the longitudinal axis of the manifold.

The injection mold preferably has an annular space surrounding the core rod adjacent to the opening through which the core rod enters the cavity; and this annular space has an outside diameter somewhat greater than the clearance between the core rod and the sides of the cavity next to the annular space but on the side of the annular space away from the opening through which the core rod enters the cavity. This portion of the cavity next to the annular space forms a neck of the parison; and in the preferred construction, the cavity is shaped so that it increases in diameter or the core rod decreases in diameter so that the clearance between the core rod and the sides of the injection cavity increase beyond the neck portion of the parison and then extend to the free end of the core rod with the clearance designed to provide the amount of parison thickness required for a subsequent blowing operation. For molding spherical or similar bodied articles, the clearance between the sides of the core pin and the sides of the injection cavity are somewhat greater than the clearance between the free end of the core pin and the end of the injection cavity that confronts the free end of the core pin.

The invention includes a blowing mold to which the core rod and its parison are carried from the injection mold. The blowing mold has an opening through which the core rod extends into the blowing cavity and the part of the blowing cavity adjacent to this opening is of a diameter substantially equal to the outside diameter of the neck of the parison, and preferably also includes an annular space for confining the annular bead at the end of this parison formed by the annular space through which the plastic was injected into the injection mold cavity.

The blowing mold is shaped to produce a spherical body on the blown article, or a body of other shape which has curvature in three dimensions, this sort of shape being the one in which imperfections on the end of the article opposite the neck would be most evident and most objectionable. The invention makes possible the blowing of Christmas tree ornaments which give perfect reflection over the entire spherical surface as compared to blown articles having rough surfaces at the ends opposite the neck that surrounds the core rod.

The molds used for this invention are preferably molds made in two parts that have relative movement toward and from one another to open and close the mold and the edges of these parts which come together to form the mold cavities are accurately made so that they fit together so closely as to avoid the forming of any ridge at the parting lines of the molds.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of a blow molding machine having the features of this invention;

FIG. 2 is a greatly enlarged, fragmentary sectional view taken on the line 2—2 of FIG. 1;

FIG. 3 is a sectional view taken on the line 3—3 of FIG. 2;

FIG. 4 is a vertical sectional view taken on the line 4—4 of FIG. 2; and

FIG. 5 is a greatly enlarged sectional view taken on the line 5—5 of FIG. 1.

DESCRIPTION OF PREFERRED EMBODIMENT

The blow molding apparatus shown diagrammatically in FIG. 1 includes an indexing head 10 which rotates about a center post 12 and which has three faces 14, 16 and 18 located at equally angular distance around the indexing head 10. A plurality of core rods 20 extend from each of the faces 14, 16 and 18. In the construction illustrated there are four such core rods 20 extending from each face.

An injection mold 22 is shown opposite the face 14. A blowing mold 24 is shown opposite the face 16 of the indexing head; and there is a stripper 26 opposite the face 18 for pushing blown articles 28 from the core pins 20 that extend from face 18.

While plastic is injected into the injection mold 22 from an extruder nozzle 30, to form parisons on the core rods 20 that project into the injection mold 22, the core rods in the blowing mold 24 are having their parisons blown; and the blown articles 28 are being ejected from the core rods 20 at the ejection station. At the end of these operations, the molds 22 and 24 open, the indexing head 10 rises enough to clear the lower parts of the molds 22 and 24, and the indexing head 10 turns through an angle of 120° to bring the core rods from one operating station to the next. The molds then close and the operations at each station are repeated. The description thus far is conventional and no further description of it is necessary for a complete understanding of this invention.

FIGS. 2 and 4 show the construction of the injection mold 22 on a larger scale. This mold 22 is made in two parts including an upper part 32 and a lower part 34 which come together at a plane 36. There is an opening 40 in one side of the mold 22, this opening having a portion of it formed in the upper part 32 of the mold and another portion formed in the lower part 34 of the mold. When the opening 40 is cylindrical, one-half of the opening is formed in the upper part of the mold and the other half in the lower part. The neck portion of the core rod 20 and the opening 40 are of corresponding diameters at different places along the length of the core rod as clearly shown in FIG. 4; and the surfaces of the opening 40 fit snugly around the corresponding neck portions of the core rod so as to prevent escape of plastic 42 from a cavity 44 into which the core rod 20 extends beyond the inner end of the opening 40 designated by the reference character 46.

The core rod 20, beyond the end of the opening 40, is shown as being of uniform diameter and this is a preferred construction; but it is not essential. The important consideration is that the plastic 42 which surrounds the core rod in the cavity 44 after the injection operation must have a wall thickness at different locations along the length of the core rod to accommodate the amount of expansion of the parison which is necessary for the shape of the article to be formed by blowing the parison in the blowing mold.

At the end of the cavity 44 adjacent to the end 46 of the opening 40, the cavity is formed with an annular space, designated by the reference character 50. This annular space or ring 50 has an outside diameter somewhat greater than the outside diameter of the cavity 44 which is adjacent to the annular space 50. The plastic that fills the annular space 50 constitutes the mouth of a bottle blown from the parison or a bead around the neck of a Christmas tree ornament. The reduced diameter portion of the parison adjacent to the annular space 50 forms a neck portion 52 for the final blown product.

Plastic is introduced into the cavity 44 from an extruder nozzle 30 shown in FIGS. 1 and 3. This extruder nozzle 30 injects plastic 42 into a passage 56 formed in the lower part of the mold. In order to supply the multiple cavities of the mold, the passage 56 has a manifold portion 57 which extends transversely of the mold 22 and under the annular space 50 (FIG. 4) of each of the mold cavities 44.

Branch passages 58 are formed by cross-drilling from the annular space 50 into the manifold portion 57 of the plastic supply passage 56. These branch passages 58 extend into the annular space 50 from opposite sides and at acute angles in opposite directions from the center line of the manifold portion 57.

Plastic 42 injected into each of the mold cavities through the annular space 50 fills the mold cavity completely.

When the injection operation is completed, the upper part 32 of the mold 22 rises for a distance somewhat greater than the maximum diameter of the core rod 20. The lower part 34 of the mold 22 remains stationary and the core rod rises half as much as the upper part of the mold so that as the index head (FIG. 1) rotates through 120° the core rods 20 can clear the upper and lower parts of the molds 22 and 24 while moving into position at the next operating station.

FIG. 5 shows the mold 24 closed around one of the core rods 20 with the upper and lower parts of the mold 24 in contact along the plane 66 and around the surfaces of the core rod 20 which is to the right of a mold cavity 68 in the blowing mold 24.

The mold cavity 68 has an annular portion 70 for receiving the complementary portion of the parison that was molded in the annular space 50 of the injection mold 22 shown in FIG. 4. The neck portion 52 of the parison in FIG. 4 is confined in a neck portion 72 (FIG. 5) of the blowing mold 24; and the rest of the cavity 68 of the blowing mold is spherical. Air or other fluid is blown through the core rod 20 from an air outlet 76, as indicated by the arrows 78. This air expands the plastic 42 into contact with the spherical surface of the cavity 68. The plastic cools and hardens in contact with the wall of the cavity 68 which is in turn cooled by the circulation of cooling fluid through cooling ducts 80 in accordance with conventional practice.

The inside surface of the cavity 68 along the edges of the upper and lower portions 82 and 84, respectively, of the mold 24, are made very accurate where they meet at the plane 66. These surfaces are ground as necessary so as not to show any line on the outside surface of the blown article which is made in the cavity 68. Thus the surface of the round bottle or Christmas ornament, designated by the reference character 88 has a perfectly spherical outside surface which shows no irregularities or imperfections which would adversely affect the reflective qualities of the surface even on an ornament having a mirror reflecting outside surface.

When the blowing operation is completed, the upper part 82 of the mold 24 rises for a distance somewhat greater than the maximum diameter of the article 88; and the core rods and articles 88 rise half as much so as to clear the upper and lower parts of the mold as the core rods turn with the indexing head to bring the articles 88 into position at the stripper station to be ejected from the core rods by the stripper 26 (FIG. 1).

The preferred embodiment of the invention has been illustrated and described, but changes and modifications can be made and some features can be used in different combinations without departing from the invention as defined in the claims.

What is claimed is:

1. Apparatus for making molded plastic articles including an injection mold having a cavity therein, a core rod, an opening at one end of the cavity through which the core rod extends into the cavity, the core rod having a neck portion fitting firmly around said opening to close the open end of the cavity against escape of plastic from the cavity during injection of a parison around the portion of the core rod that extends into the cavity, the core rod having a free end remote from said neck portion and spaced from the end of the cavity that is remote from said opening through which the core rod extends into the cavity, a passage in the mold opening at one end through a side of the mold and leading to the cavity at a location adjacent to the end of the cavity through which the neck portion of the core rod extends into said cavity, an extruder for forcing plastic into the end of the passage that opens through the side of the mold, and a blowing mold to which the core rod is transferred after injection of the parison.

2. The apparatus described in claim 1 characterized by the injection mold being in two parts that move with respect to one another to open and close the mold, the opening through which the core rod extends into the cavity having a portion in one part of the mold and another portion in the other part of the mold, said portions fitting snugly around the core rod when the mold is closed, and the passage through which plastic flows into the cavity leading into the cavity adjacent to the cavity end at which the core rod extends into the cavity.

3. The apparatus described in claim 2 characterized by the passage through which plastic flows into the cavity terminating in an annular space in the cavity at the end of the cavity into which the core rod extends, said space having an outside diameter larger than the diameter of that portion of the cavity which is adjacent to said annular space.

4. The apparatus described in claim 3 characterized by the clearance between the core rod and the sides of the cavity increasing in a direction away from said annular space, and the end of the core rod having a clearance from the end of the cavity less than the maximum clearance between the core rod and the sides of the cavity.

5. The apparatus described in claim 1 characterized by the mold having a plurality of cavities, and the passage for supplying plastic to the cavities including a manifold formed in the mold and having branch passages leading into the cavities.

6. The apparatus described in claim 5 characterized by there being two branch passages extending into each cavity, the branch passages for each cavity extending into the cavity from different sides thereof and at acute angles to the direction of extent of the manifold, the acute angles having directions sloping oppositely with respect to the longitudinal axis of the manifold.

7. The apparatus described in claim 1 characterized by a blowing mold to which the core rod and a parison on the core rod are transferred beyond the injection mold, a cavity in the blowing mold having a neck portion that confines the portion of the parison that was located at the end of the passage through which plastic was injected into the cavity of the injection mold.

8. The apparatus described in claim 7 characterized by the blowing mold beyond the neck portion being curved in three dimensions.

9. The apparatus described in claim 8 characterized by the surfaces of the blowing mold beyond the neck portion being substantially spherical.

10. The apparatus described in claim 1 characterized by a blowing mold to which the core rod and a parison on the core rod are transferred beyond the injection mold, the blowing mold being made in two parts that move with respect to one another to open and close the mold, and the blowing mold having a cavity open at one end, when the mold is closed, for the core rod to extend into the blowing mold, the cavity of the blowing mold being located partly in the two different parts of the blowing mold, and being shaped to form an article that is curved in three dimensions everywhere beyond the contact of the blown article with the core rod, the edges where the surfaces of the blowing mold in the different parts of the mold come together, when the mold is closed, being accurately finished so as to leave no parting line on the molded article where the different parts of the mold come together.

* * * * *